Figure 1:
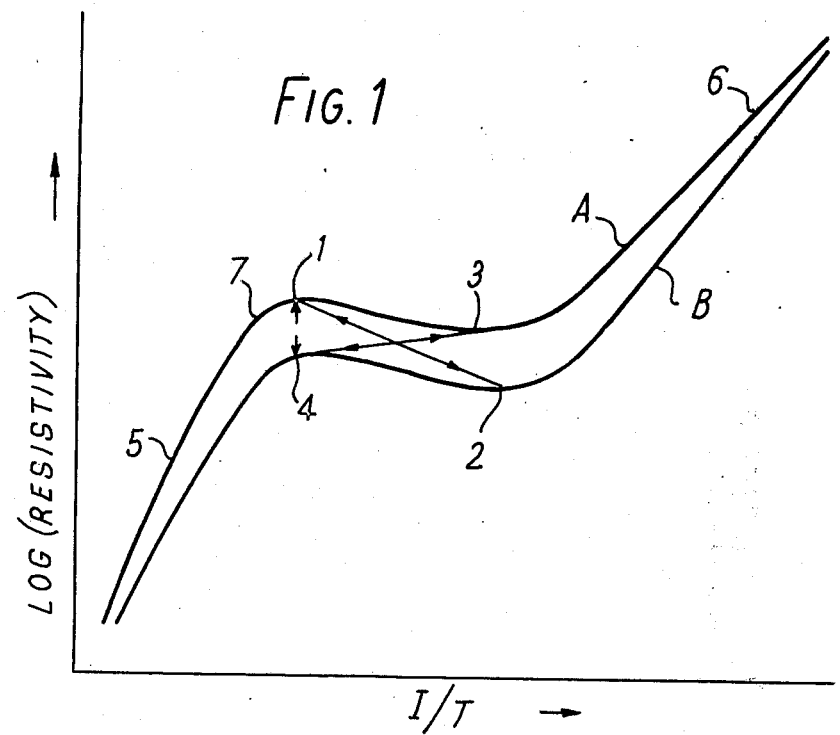

United States Patent [19]
Maslen

[11] 3,879,985
[45] Apr. 29, 1975

[54] DETECTION AND ANALYSIS OF GASES OR VAPOURS

[76] Inventor: Christopher Gordon Maslen, 206 New Rd., Parley, Wimborne, Dorset, England

[22] Filed: July 11, 1973

[21] Appl. No.: 378,299

[30] Foreign Application Priority Data
July 11, 1972 United Kingdom............... 32421/72

[52] U.S. Cl............. 73/27 R; 324/65 R; 324/71 SN; 338/34
[51] Int. Cl. .......................................... G01n 31/00
[58] Field of Search ................... 73/27 R, 23, 399 R; 23/232 E, 254 E, 255 E; 338/34; 340/237 R; 324/65 R, 71 SN

[56] References Cited
UNITED STATES PATENTS

| | | |
|---|---|---|
| 3,251,654 | 5/1966 | Palmer.......................... 23/254 E X |
| 3,603,954 | 9/1971 | Takeuchi........................ 23/254 E X |
| 3,634,757 | 1/1972 | Monomakhoff................. 73/27 R X |
| 3,676,820 | 7/1972 | Taguchi ......................... 73/27 R X |
| 3,695,848 | 10/1972 | Taguchi ........................ 73/27 R X |

*Primary Examiner*—Richard C. Queisser
*Assistant Examiner*—Stephen A. Kreitman
*Attorney, Agent, or Firm*—Lawrence Rosen; E. Janet Berry

[57] ABSTRACT

Method and apparatus for detecting and analysing gases and vapours uses a semiconductor material maintained at a temperature in the vicinity of its so called "exhaustion region." In the presence of the gas condition to be detected or analysed, the electrical conductivity of the semiconductor material is changed, and this changes the maintained temperature of the semiconductor material so that its sensitivity to gas is increased.

6 Claims, 4 Drawing Figures

DETECTION AND ANALYSIS OF GASES OR VAPOURS

The present invention relates to the detection and analysis of gases or vapours.

It is known that the electrical conductivity of a semiconductor material is sensitive to the presence of gases or vapours in the atmosphere surrounding the semiconductor and known methods of gas detection and analysis measure the change in electrical conductivity of a semiconductor material maintained at a stable temperature.

It is an object of the present invention to provide for the detection of very low concentrations of gases or vapours.

The electrical conductivity of a semiconductor material is dependent on the temperature of the material. At relatively low temperatures, the so-called extrinsic range, conductivity increases with temperature and is due mainly to non-stoichiometrical components or impurity components in the semiconductor. At relatively high temperatures, the so-called intrinsic range, conductivity is due to thermal excitation of the electrons of the semiconductor material and conductivity also increases with temperature. Between the extrinsic and intrinsic ranges many semiconductors exhibit a range in which their conductivity does not increase with increasing temperature or may, in some cases, fall with increasing temperature. This region, which will be referred to as the "exhaustion region," corresponds to a region in which all the donors (or acceptors) that contribute in the extrinsic range are fully ionised, but in which thermal excitation is not high enough for a significant contribution to be made to the conductivity by intrinsic carriers.

The present invention can, in principle, utilise any semiconductor material that exhibits an exhaustion region.

According to the present invention there is provided apparatus for detecting or analysing a gas condition comprising a semiconductor material that exhibits an exhaustion region, a constant current control circuit arranged to heat the semiconductor material, means controlling the constant current control circuit and maintaining the temperature of the semiconducting material, in the absence of the gas condition to be detected or analysed, at a value in the vicinity of one end of its exhaustion region, and means for measuring change in voltage drop across the semiconductor material, which change, in the presence of the gas condition to be detected or analysed, comprises a gas signal component, resulting from the change in conductivity of the semiconductor material in the presence of the gas condition, and a temperature signal component, resulting from the change in conductivity of the semiconductor material on change in the maintained temperature of the material imposed by the constant current control circuit when the conductivity of the material changes.

The present invention also provides a method of detecting or analysing a gas condition comprising the steps of providing a semiconductor material that exhibits an exhaustion region, heating the semiconductor material by means of a constant current control circuit and the temperatures of the semiconductor material, in the absence of the gas condition to be detected or analysed, at a value in the vicinity of one end of its exhaustion region and measuring changes in voltage drop across the semiconductor material, which change, in the presence of the gas condition to be detected or analysed, comprises a gas signal component, resulting from the change in conductivity of the semiconductor material in the presence of the gas condition, and a temperature signal component, resulting from the change in conductivity of the semiconductor material on change in the maintained temperature of the material imposed by the constant current control circuit when the conductivity of the material changes.

The gases which can be detected by the use of the present invention depend on the semiconductor material, the type and concentration of donors (or acceptors), the temperature range of the exhaustion region, and the direction and locus by which the control circuit changes the maintained temperature of the semiconductor in increasing gas concentration. However, for certain semiconductor metal oxides, of which zinc oxide is typical, concentrations of gaseous contaminants as low as 1 part per million, or even less, can in favourable conditions be measured and under the most favourable conditions limits of detection down to 0.01 parts per million can be achieved for some semiconductor-gas couples.

In one embodiment of the present invention an n-type semiconductor metal oxide is operated in its exhaustion region and the temperature control system is set so that the maintained temperature of the material in clean air is at the high temperature end of the exhaustion region where the intrinsic carriers begin to make a significant contribution to the conductivity of the material. The semiconductor material is either partially or totally heated by the passage of electric current through the material from a constant current control circuit. As the electrical conductivity of the material increases in response to the presence of a contaminant gas the temperature of the semiconductor material decreases because the amount of heat dissipated, $i^2R$, falls. This embodiment of the invention is suitable for the detection of low concentrations in air of a number of gases and vapours which, for zinc oxide doped with 2% platinum, include ketones, aldehydes, alsohols, esters, ethers, high carbon number aromatic, alicyclic, unsaturated and paraffin hydrocarbons, and certain toxic compounds such as trichloroethylene and hydrogen sulphide. This embodiment of the invention can also be used to indicate decreasing concentration of oxygen in air when a p-type material is used. Furthermore, if the maintained temperature in clean air is selected so that it is further into the region where the intrinsic carriers are important, i.e., higher temperature, a relatively low response to gas is obtained until a predetermined concentration of gas is exceeded and the detector enters the exhaustion region amplifier mode.

In another embodiment of the present invention a semiconductor metal oxide is operated in its exhaustion region and is set with its maintained temperature in clean air at the edge of the exhaustion region where the donors (or acceptors) first become fully ionised, i.e., the low temperature end of the exhaustion region. A constant current type of control circuit is again used and is designed to increase the temperature of the material as the electrical conductivity decreases in response to gas. This embodiment of the invention is suitable for the detection of increasing concentrations of oxygen in air when used with an n-type material and for the detection of low concentrations of reducing gases such as hydrogen when used with a p-type semiconductor metal oxide.

Figure 2:
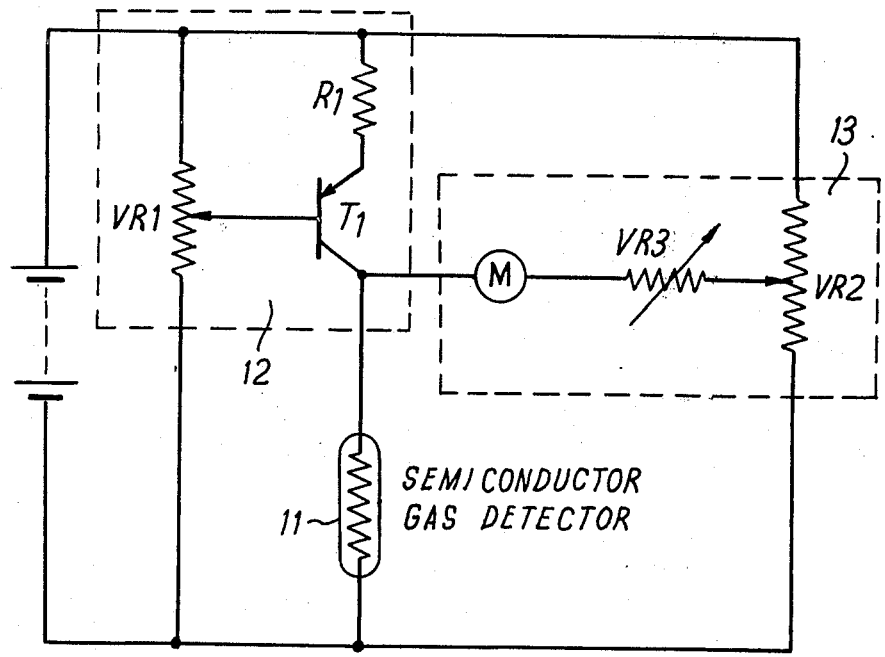
Figure 3:
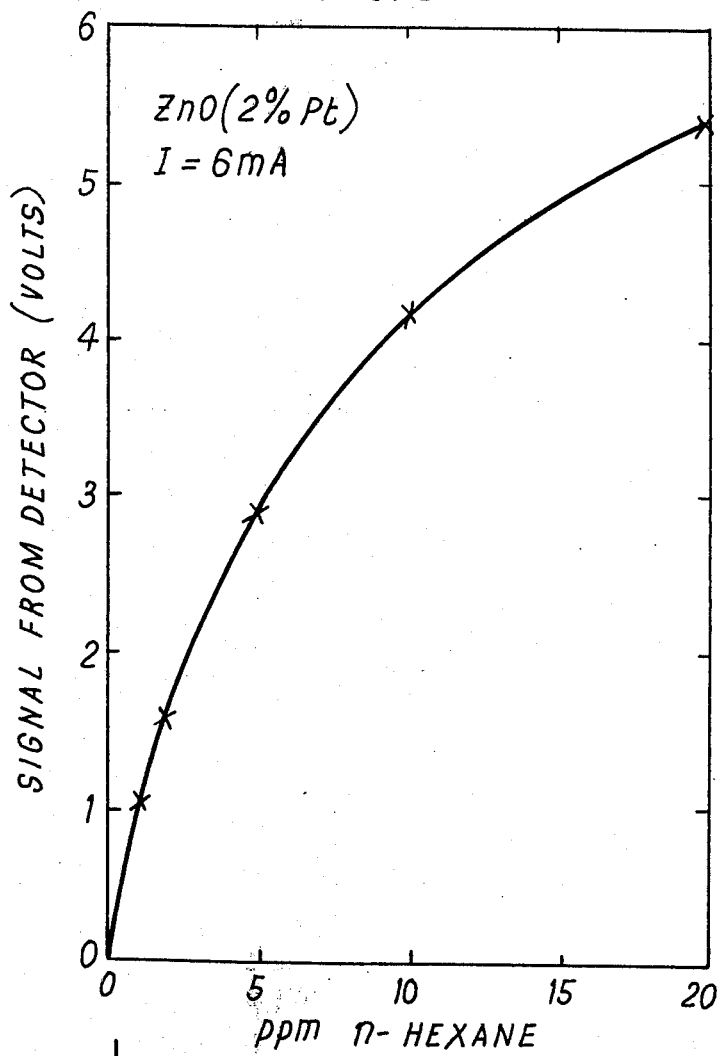
Figure 4:
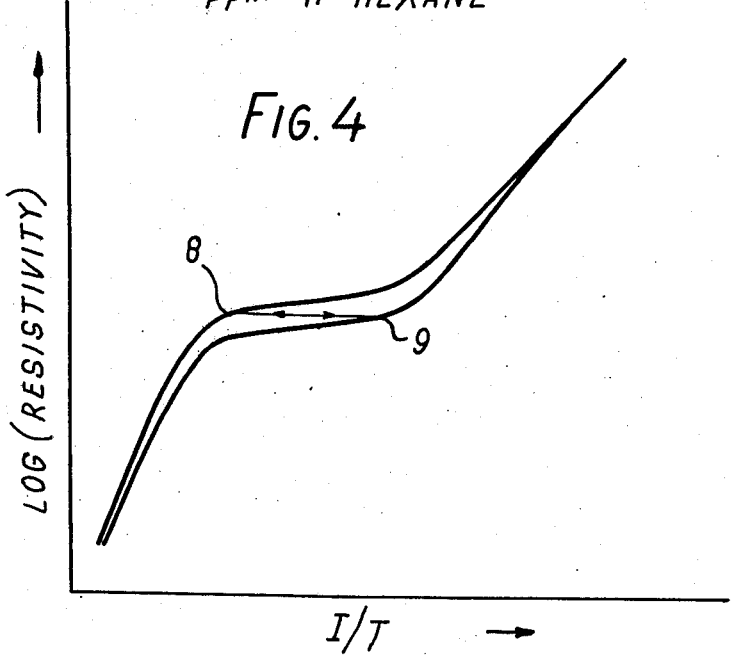

The invention will now be described by way of example with reference to the accompanying drawings, in which:

FIG. 1 shows the general shape of the most common type of relation between conductivity and temperature for a semiconductor material, FIG. 2 shows schematically one form of gas detector embodying the invention, FIG. 3 shows the temperature/conductivity relation for a semiconductor which exhibits a negative temperature coefficient in the exhaustion region, and FIG. 4 shows a typical exhaustion region amplifier mode response curve for n-hexane.

In FIG. 1 log $\rho$ (where $\rho$ is the resistivity) has been plotted against $1/T$ (where $T$ is the absolute temperature). The curve A respresents the conductivity of the semiconductor material in pure air and the intrinsic region and extrinsic region can be seen on either side of the exhaustion region. In this example the temperature coefficient of resistivity is positive in the exhaustion region. Curve B in FIG. 1 represents the conductivity of the semiconductor material in the presence of low concentrations of contaminant gases. It is found that similar changes in conductivity occur if the ambient atmosphere is changed, e.g. by large changes in the oxygen concentration in the air.

The variation of semiconductor resistivity with temperature shown in FIG. 1 exhibits two regions of negative temperature coefficient of resistivity, one in the intrinsic limit 5 and the other in the low temperature extrinsic limit 6. In the region between, a positive temperature coefficient of resistivity is exhibited. If the curve joining 5, 7, 1, 3 and 6 is obtained in clean air, the curve joining 4 and 2 represents the displacement caused by a reducing gas adsorbed on or reacting at the surface of an n-type semiconductor material or it represents the displacement caused by increasing concentration of oxygen in air on a p-type material. Conversely, if the curve joining 4 and 2 is obtained in clean air the upper curve represents the displacement caused by an increasing concentration of oxygen in air on an n-type material or by a reducing gas on a p-type material.

The curve joining 1 and 2 is obtained with a constant current type of control circuit when the material is either partially or totally heated by the passage of current through the semiconductor material, or is the curve obtained by employing a more complex type of control circuit when the semiconductor material is indirectly heated, and represents the large total change is electrical conductivity and temperature resulting from the exposure of the semiconductor material to a low concentration of contaminant gas.

An example of gas detector incorporating a semiconductor material with conductivity/temperature response as described with reference to FIG. 1, is now described. The semiconductor is an n-type metal oxide, namely zinc oxide doped with 2% platinum, and is heated solely by the passage of electric current through it from a constant current control circuit 12, see FIG. 2. The maintained temperature of the semiconductor 11 is preset by the variable resistance potentiometer VR1 to a value at the high temperature end of the exhaustion region, where intrinsic carriers begin to make a significant contribution to the conductivity of the semiconductor 11. This corresponds to the point 1 on curve A in FIG. 1. In the presence of a low concentration in the ambient atmosphere of a contaminant gas, such as an unburnt hydrocarbon emitted from a motor vehicle exhaust, the conductivity of the semiconductor 11 increases. Because the control circuit 12 maintains the current through the semiconductor 11 constant the temperature of the semiconductor will fall. The current control circuit and supply voltage adjust the temperature of the semiconductor 11 in such a way that the curve joining points 1 and 2 in FIG. 1 is obtained for varying concentrations of a contaminant gas.

The change of voltage across the semiconductor material 11 in response to the presence of a low concentration of a contaminant gas in a measure of the reduction is maintained temperature imposed by the control circuit and the exhaustion region profile of the semiconductor in contaminated air. The meter circuit 13 in FIG. 2 therefore indicates this voltage change as a measure of the concentration of the contaminant gas. VR2 is the off-set zero control and VR3 controls the span of the meter indication.

The apparatus is calibrated on n-hexane so that concentrations of other unburnt hydrocarbons detected can be expressed as hexane equivalent. A typical exhaustion region amplifier mode response curve for n-hexane is shown in FIG. 3.

The variation of semiconductor resistivity with temperature shown in FIG. 4 exhibits a negative, instead of positive, temperature coefficient of resistivity in the exhaustion region. The curve joining 8 and 9 is obtained with a constant resistance type of control circuit and represents an exhaustion region amplifier mode of response for a semiconductor material having this type of exhaustion region.

The present invention thus has provided a method for using the change of electrical conductivity resulting from the presence of a contaminant gas to change the maintained temperature of the semiconductor material so that its sensitivity to gas increased. This feedback to the maintained temperature of the semiconductor material allows the gas signal to be amplified by the semiconducting properties of the detector material itself. The invention therefore provides a method for utilising the exhaustion region of a semiconductor to obtain a very high application of a gas signal.

I claim:

1. Apparatus for detecting or analysing a gas condition comprising a semiconductor material that exhibits an exhaustion region, a constant current control circuit connected to said semiconductor material for heating said semiconductor material, means controlling the constant current control circuit and maintaining the temperature of the semiconductor material, in the absence of the gas condition to be detected of analysed, at a value in the vicinity of one end of its exhaustion region, and means for measuring change in voltage drop across the semiconductor material, which change, in the presence of the gas condition to be detected or analysed, comprises a gas signal component, resulting from the change in conductivity of the semiconductor material in the presence of the gas condition, and a temperature signal component, resulting from the change in conductivity of the semiconductor material on change in the maintained temperature of the material imposed by the constant current control circuit when the conductivity of the material changes.

2. Apparatus according to claim 1, in which the means for measuring changes in temperature comprises means for measuring the potential drop across the semiconductor material.

3. Apparatus according to claim 1, in which the semiconductor is an n-type material.

4. Apparatus for detecting the presence of a given gas in concentrations of less than about 1 part per million comprising, in combination: a semiconductor material which has a conductivity characteristic which exhibits a low temperature extrinsic negative resistance characteristic, a high temperature intrinsic negative resistance characteristic, and an exhaustion region between said low and high temperature regions which exhibits a more positive resistance characteristic than is exibited in said intrinsic and extrinsic regions; a constant current source connected in series with said semiconductor material for maintaining a constant current through said semiconductor material and for normally heating said semiconductor material to a temperature in said exhaustion region; means for exposing the surface of said semiconductor material to said given gas; and means for measuring the voltage drop across said semiconductor material, whereby a change in the voltage drop across said semiconductor material indicates a change in the concentration of said given gas in the vicinity of the surface of said semiconductor material.

5. Apparatus according to claim 4 in which said semiconductor material is an n-type metal oxide.

6. Apparatus according to claim 5 in which said semiconductor material is zinc oxide, doped with a small percentage of platinum.

* * * * *